United States Patent
Arai et al.

(10) Patent No.: US 8,013,911 B2
(45) Date of Patent: Sep. 6, 2011

(54) METHOD FOR MIXING HIGH-GAIN AND LOW-GAIN SIGNAL FOR WIDE DYNAMIC RANGE IMAGE SENSOR

(75) Inventors: Emi Arai, Ibaraki (JP); Yuji Itoh, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 421 days.

(21) Appl. No.: 12/414,392

(22) Filed: Mar. 30, 2009

(65) Prior Publication Data

US 2010/0245620 A1  Sep. 30, 2010

(51) Int. Cl.
- H04N 5/235 (2006.01)
- H04N 5/228 (2006.01)
- H04N 9/68 (2006.01)
- H04N 5/20 (2006.01)
- G06K 9/40 (2006.01)

(52) U.S. Cl. ............ 348/229.1; 348/221.1; 348/222.1; 348/235; 348/255; 382/274; 382/276

(58) Field of Classification Search .......... 348/229.1, 348/294, 222.1, 296, 297, 302–311, 221.1, 348/333.01–333.12, 241, 243, 234–237, 348/255; 382/260–264, 274, 276

See application file for complete search history.

(56) References Cited

U.S. PATENT DOCUMENTS

| | | | | |
|---|---|---|---|---|
| 7,230,644 | B2 * | 6/2007 | Nakamura et al. | 348/254 |
| 7,382,403 | B2 * | 6/2008 | Sakamoto | 348/230.1 |
| 7,750,950 | B2 * | 7/2010 | Tamaru et al. | 348/227.1 |
| 7,830,420 | B2 * | 11/2010 | Hyoudou | 348/229.1 |
| 2009/0002530 | A1 * | 1/2009 | Arai et al. | 348/294 |

* cited by examiner

Primary Examiner — Lin Ye
Assistant Examiner — Marly Camargo
(74) Attorney, Agent, or Firm — Robert D. Marshall, Jr.; W. James Brady; Frederick J. Telecky, Jr.

(57) ABSTRACT

A wide dynamic range image sensor method combines the response of high-gain sensing cells and low-gain sensing cells with better linearity than the prior art. A search is made in successive central regions within the response curve of the high-gain and low-gain cells to find a highest slope linear fit. This highest slope and the corresponding offset are used in mixing the high-gain and low-gain responses to achieve a wide dynamic range.

13 Claims, 6 Drawing Sheets

METHOD FOR MIXING HIGH-GAIN AND LOW-GAIN SIGNAL FOR WIDE DYNAMIC RANGE IMAGE SENSOR

TECHNICAL FIELD OF THE INVENTION

The technical field of this invention is image sensors.

BACKGROUND OF THE INVENTION

This invention is an improved method of mixing high-gain and low-gain sensing cells for a wide dynamic range image. These type image sensors enable a greater dynamic range sensing from a single exposure due to the differing gain factors of the two sensing cell types.

SUMMARY OF THE INVENTION

A wide dynamic range image sensor method combines the response of high-gain sensing cells and low-gain sensing cells with better linearity than the prior art. A search is made in successive central regions within the response curve of the high-gain and low-gain cells to find a highest slope linear fit. This highest slope and the corresponding offset are used in mixing the high-gain and low-gain responses to achieve a wide dynamic range.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
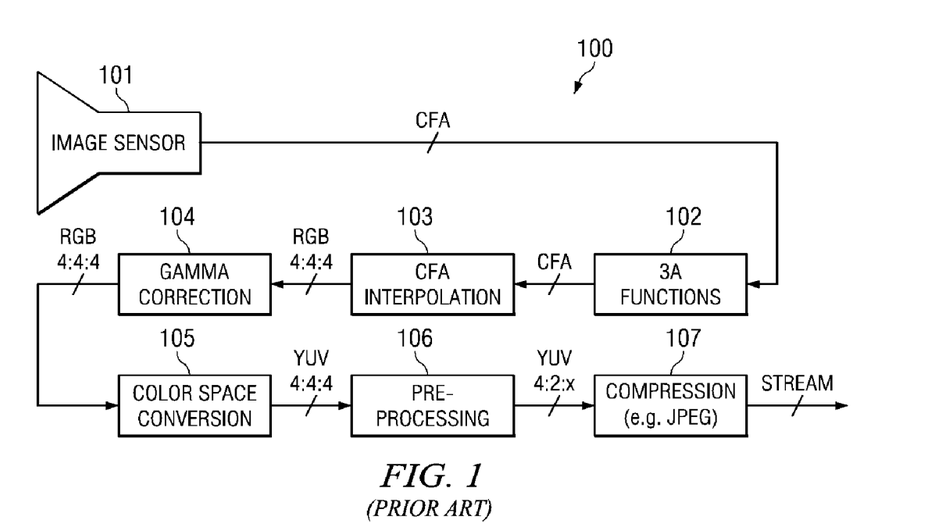
FIG. 1 illustrates the block diagram of a typical prior art image sensing system.

FIG. 1 illustrates the typical block diagram 100 of a prior art image processing system (ISP). Such ISPs are employed in the prior art in digital image capturing systems such as digital still cameras (DSC) to construct an image frame from sensor input. ISP 100 illustrated in FIG. 1 includes: image sensor 101; 3A function block 102; CFA interpolation block 103; gamma correction block 104; color space conversion block 105; pre-processing block 106 and compression block 107.

Image sensor 101 is generally a charge coupled device (CCD) or a complementary metal oxide semiconductor (CMOS) imager. Image sensor 101 captures incoming light and converts it into an electric signal. As illustrated in FIG. 1, this electric signal typically is represented in a color filter array (CFA) format. The CFA format will be further detailed below.

The 3A function block 102 embodies three typical ISP operations. These are: automatic focus (AF); automatic exposure (AE); and automatic white balance (AWB). The camera optics projects external objects onto image sensor 101. In most cases, the initial image captured through the camera optics suffers low contrast, insufficient or excessive exposure and irregular colors. AF controls camera optics to maximize contrast. AE controls camera optics to obtain a proper exposure. Automatic white balance controls the camera to automatically correct irregular colors.

Single sensor digital cameras widely used in consumer products generally employ a color filter array (CFA) to represent multiple color spectral components red, green and blue. This contrasts with 3 sensor cameras intended for professional use. According to the CFA technique each pixel obtains only one color sample either red, green or blue. The two color components for that pixel must be interpolated from neighboring pixels. This color plane interpolation is known as CFA interpolation. CFA interpolation block 103 provides this function in imaging system 100. As a result of this CFA interpolation the number of pixels to be processed is tripled through. In the example of FIG. 1 the resulting signal is in a RGB 4:4:4 format.

Gamma correction block 104 provides an internal adjustment to compensate for nonlinearities in imaging systems. In particular, cathode ray tube (CRT) and liquid crystal display (LCD) thin film transistor (TFT) monitors and printers. Gamma correction block 104 provides a power-law relationship that approximates the relationship between the encoded luminance in a rendering system and the actual desired image brightness. A CRT converts a signal to light in a nonlinear way because the electron gun of a CRT is a nonlinear device. To compensate for the nonlinear effect, gamma correction block 104 provides an inverse transfer function before encoding. This inverse compensation causes the end-to-end response to be linear. Thus the transmitted signal is deliberately distorted so that, after it has been distorted again by the display device, the viewer sees the correct brightness.

Color space conversion block 105 changes change the way that colors are represented in images. Current devices represent colors in many different ways. The YUV color space dominates in digital camera applications because it is supported by compression standards such as JPEG and MPEG. These compression standards are an essential component for digital cameras. Therefore color space conversion block 105 converts RGB image signals from gamma correction block 104 to YUV image signals. This conversion is usually performed using a 3 by 3 transform matrix. In the example of FIG. 1 color space conversion block 105 outputs the image signal in a YUV 4:4:4 format.

Pre-processing block 106 provides several functions including edge enhancement, false color correction, chroma format conversion and the like. The edge enhancement and false color correction improve subjective image quality. These functions are optional, but are provided in most recent products. Chroma format conversion is essential. The image format needs to be converted from YUV 4:4:4 to either the YUV 4:2:2 or the YUV 4:2:0 used in JPEG and MPEG standards. The ISP algorithm is generally understood as complete with block pre-processing block 106.

Compression block 107 is illustrated in FIG. 1 but is generally believes to be outside the ISP algorithm. The image compression technique used in compression block 107 varies depending on the application. For DSC JPEG compression is generally considered mandatory. MPEG compression, some lossless codec and even proprietary schemes are often employed.

Figure 2:
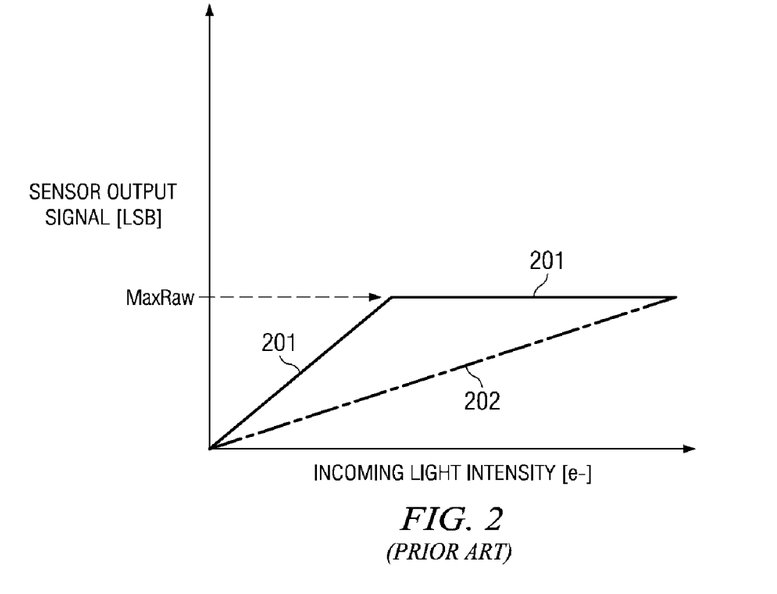
FIG. 2 illustrates sensor gain curves of the ideal relationship between output signal and incoming light according to the prior art.

This invention is applicable to a so-called wide dynamic range (WDR) sensor. A WDR sensor is an innovative image capturing device. There are several schemes to realize wide dynamic range sensor. This invention is applicable to a device equipped with two types of sensing cells. Each sensing cell type has a corresponding gain factor or sensitivity to input light. The first sensor type is a high-gain cell S1. The second sensor type is a low-gain S2. It is assumed that conventional image sensors have only high-gain cells. FIG. 2 illustrates the sensor gain curves representing the ideal relationship between output signal and incoming light. The incoming light intensity is designated [e−] for electron representing units of input light intensity. The sensor output is designated [LSB] for least significant bit representing sensor output signal. The gain curve 201 of S1 and gain curve 202 of S2 are both designed to be linear over the entire dynamic range. Therefore, we define that S1 has a linear gain factor of $\alpha 1$ and S2 has a linear gain factor of $\alpha 2$ both expressed in units of [LSB/e−]. As its name implies S1 has larger gain than S2, thus $\alpha 1 > \alpha 2$. Both S1 and S2 have the same saturation point MaxRaw. Note gain curve 201 saturates at an inflection point where further increases in light intensity produce no further increase in signal output. A single pixel includes pair of sensing cells S1 and S2 called a collocated pair. These are provided in a pixel array to constitute the entire image sensor. Thus a WDR sensor has twice as many sensing cells as an ordinary image sensor.

Figure 3:
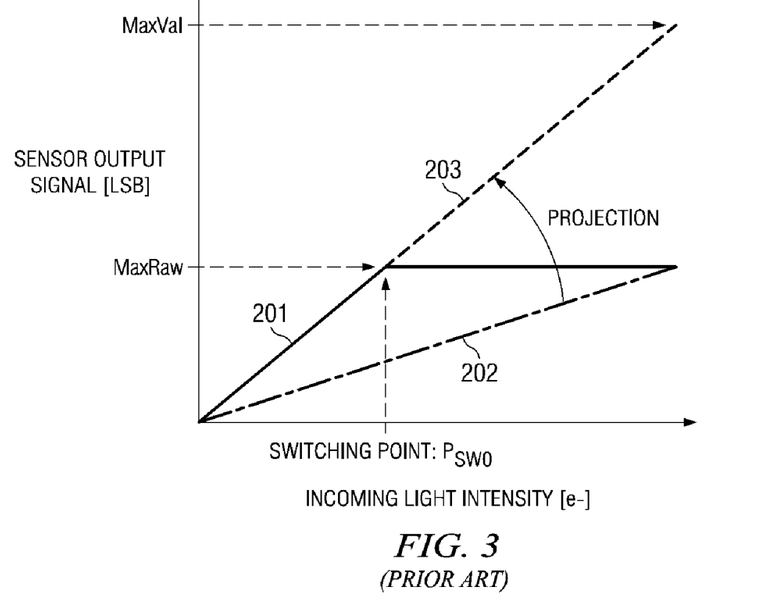
FIG. 3 illustrates the concept of how to achieve wide dynamic range in accordance with the prior art.

FIG. 3 illustrates the main concept of how to achieve wide dynamic range. FIG. 3 shows gain curve 201 of S1 and gain curve 202 of S2 as illustrated in FIG. 2 and projected low-gain curve 203. Let switching point $P_{SW1}$ denote the minimum input light that yields an output signal MaxRaw with sensor type S1. Suppose a conventional image sensor that has only sensor type S1 receives light whose intensity is larger than $P_{SW0}$. According to the S1 gain curve 201, the output signal gets saturated after applying the gain factor $\alpha 1$ to the light intensity $P_{SW0}$. The sensor thus outputs MaxRaw for any incoming light whose intensity equals or exceeds $P_{SW0}$. This is called white washout. In a region of white washout precise gray level fluctuation in output signal domain is lost. All these pixels are represented by MaxRaw, which is white. White washout is a major shortcoming of conventional image sensors. Taking photo shots recursively against a static scene permits gradually tuning gain related parameters to excessive incoming light to avoid white washout. This workaround includes: increasing the shutter speed providing a shorter exposure time; reducing the iris; and decreasing the gain factor of an analog gain amplifier. This cannot be used with a dynamic scene where either the object or the light condition source or path varies with time. A similar scenario holds for black washout which is opposite to white washout where a low light intensity yields a mostly black region.

A WDR sensor equipped with both S1 and S2 sensor types can better deal with white washout and black washout. Theoretically the dynamic range of a WDR sensor is $\dot{\beta}$ times as wide as that of conventional image sensor equipped with only S1 sensor types, where $\dot{\beta}$ is the ratio of $\alpha 1$ to $\alpha 2$ $$\left(\dot{\beta} = \frac{\alpha 1}{\alpha 2}\right).$$

This is called design beta. Given that $\dot{\beta}$ is known, the S2 output signal multiplied by $\dot{\beta}$ (known as projected S2 signal 203 in FIG. 3) predicts a true S1 output signal. Below the S2 saturation point $P_{SW0}$ the WDR sensor uses the S1 signal because S1 has a higher signal to noise ratio (SNR) than S2. Above the S1 saturation point $P_{SW0}$ the WDR sensor uses the projected low-gain signal 203. The output of the WDR sensor denoted by $F_0(t)$ is expressed by:

$$F_0(t) = \begin{cases} f_1(t) & \text{if } t \le P_{SW0} \\ \beta_0 \times f_2(t) + \lambda_0 & \text{otherwise} \end{cases} \quad (1)$$

where: $f_1(t)$ is the output signal level of S1; $f_2(t)$ is the output signal level of S2; $\beta_0$ is the gradient of the relationship between collocated S1 and S2 signals; and $\lambda_0$ is the offset in the relationship between collocated S1 and S2 signals. Note $\beta_0$ and $\lambda_0$ are calculated from actual data according to the prior art method while $\dot{\beta}$ is fixed at design time as a design parameter.

Figure 4:
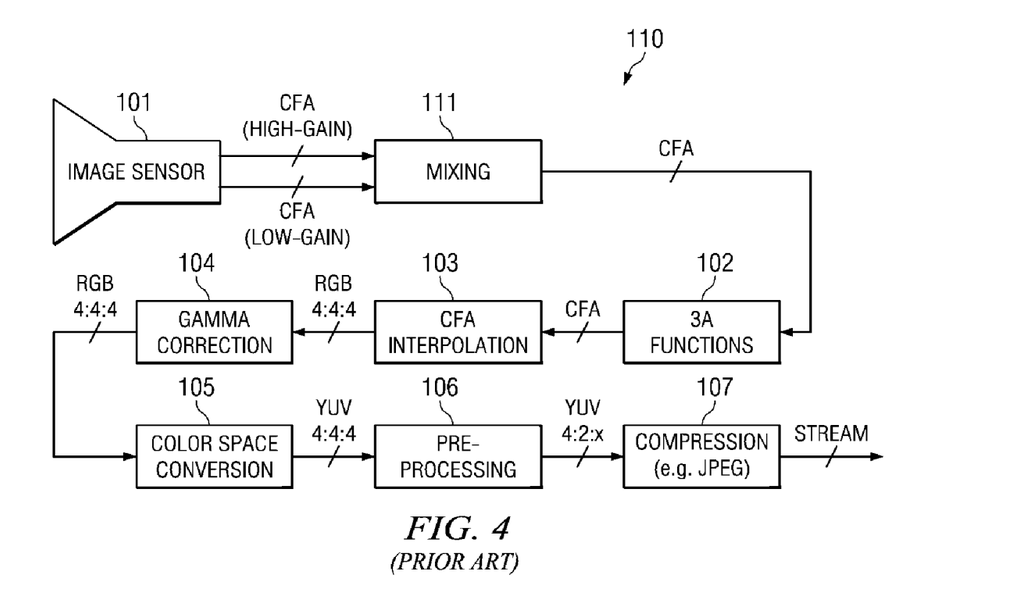
FIG. 4 illustrates a block diagram of a prior art wide dynamic range image sensing system.

FIG. 4 illustrates a block diagram of a wide dynamic range image sensor ISP algorithm 110. FIG. 4 illustrates: image sensor 101; 3A function block 102; CFA interpolation block 103; gamma correction block 104; color space conversion block 105; pre-processing block 106 and compression block 107. These blocks are the same as correspondingly numbered blocks illustrated in FIG. 1. The only major difference between non-WDR ISP algorithm 100 of FIG. 1 and WDR ISP algorithm 110 illustrated in FIG. 4 is the addition of mixing block 110 in WDR ISP algorithm 110. Mixing block 110 seamlessly mixes the S1 and S2 signals in the manner shown in FIG. 3. This mixing comprises two main tasks: calculation of relationship formula between S1 and S2 as in Equation (1); and fitting S2 signals into the S1 axis by projecting S2 signals using the relationship formula paying special attention to seamless migration from S1 to S2 region around transition area near MaxRaw.

Figure 5:
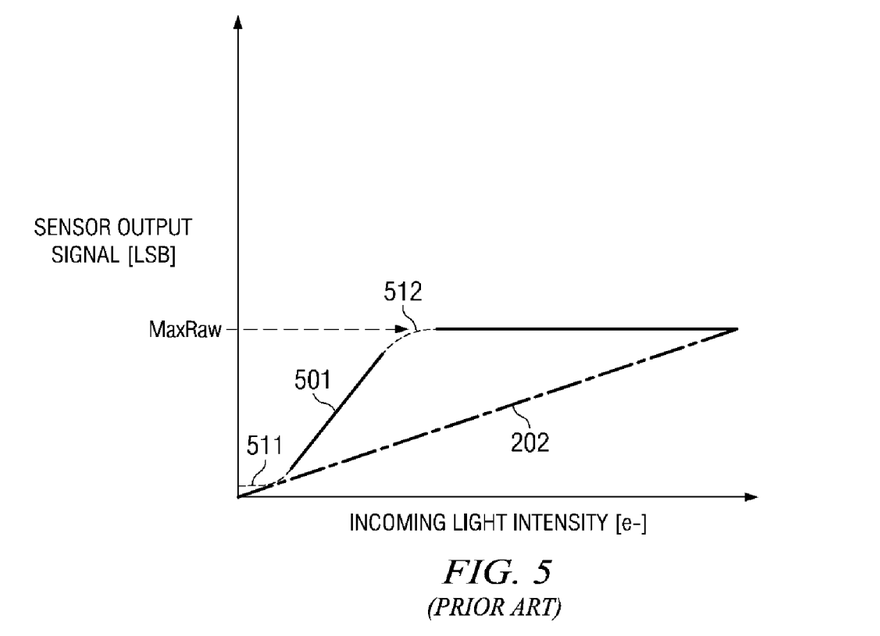
FIG. 5 illustrates sensor gain curves of a realistic view of the relationship between output signal and incoming light.

In the prior art $f_1(t)$ and $f_2(t)$ in Equation (1) were assumed to be linear functions, thus $f_1(t)=\alpha_1 t$ and $f_2(t)=\alpha_2 t$. This assumption isn't necessarily true for actual devices. FIG. 5 illustrates S2 gain curve 202 and more realistic S1 gain curve 501. S1 gain curve 501 includes a gentler slope in a first non-linear region 511 near zero and a second non-linear region 512 near the saturation point MaxRaw. Dark current noise offset is the main causes of the non-linearity of region 511. Rounding error is the main cause of non-linearity of region 512.

Figure 6:
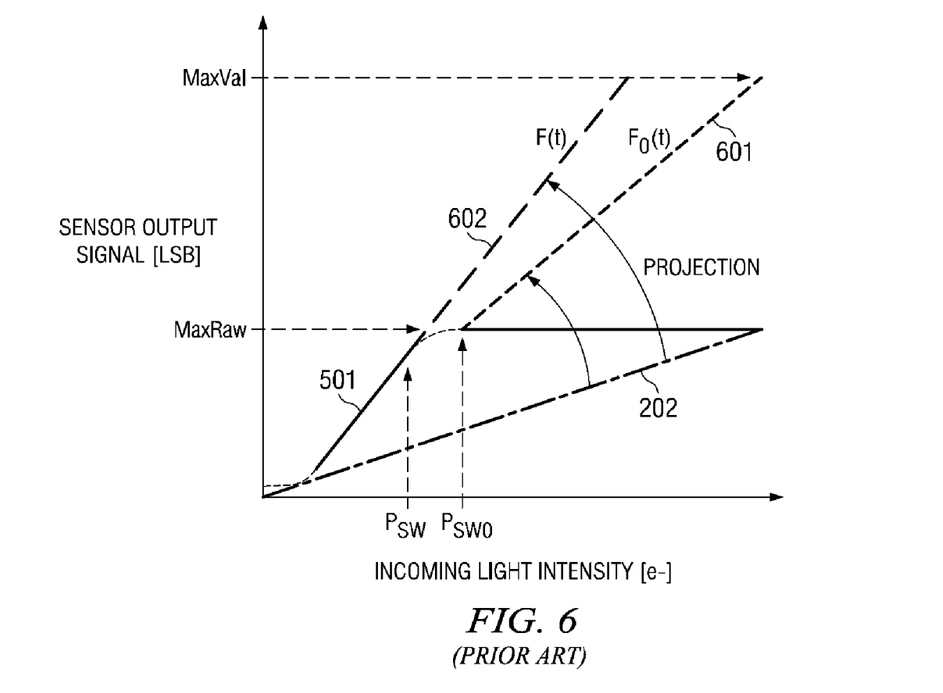
FIG. 6 illustrates the results of applying linearization to the non-linear gain curve of FIG. 5.

FIG. 6 illustrates the results of applying equation (1) to the non-linear gain curve 501 of FIG. 5. Equation (1) assumes that S1 gain curve 501 is linear between zero and $P_{SW0}$. Calculating a projection of S2 gain curve 202 based upon this linearity assumption results in a gain curve 202 projection 601 having a slope $F_0(t)$. FIG. 6 illustrates that this projected S2 signal 601 is not smoothly connected to S1 gain curve 501. Using equation (1) based upon the linearity assumption results in quality degradation to the resultant image after the mixing process.

FIG. 6 also illustrates a better projection 602. Projection 602 is the result of extension of the linear region of S1 gain curve 501. This projection has a different gradient and a different offset. Note that in projection 602 the joining is at point $P_{SW}$ which is the maximum of the linear region of S1 gain curve 501. This results in a new projection denoted by equation (2):

$$F(t) = \begin{cases} f_1(t) & \text{if } t \le P_{SW} \\ \beta \times f_2(t) + \lambda & \text{otherwise} \end{cases} \quad (2)$$

where: $f_1(t)$ is the output signal level of S1; $f_2(t)$ is the output signal level of S2; $\beta$ is the gradient of the relationship between the linear part of the S1 signal and the S2 signal; and $\lambda$ is the offset in the relationship between the linear part of the S1 signal and the S2 signal.

The prior art includes three possible implementations of the computation of equation (2). These are: a default mode which $\beta$ and $\lambda$ are fixed on a sensor device basis; an on-the-fly mode which $\beta$ and $\lambda$ are derived from actual sensor data using a method of least squares (MLS); and an off-line mode that is a mixture of the default mode and on-the-fly mode.

However, in actual devices neither the S1 nor S2 gain curves of FIG. 6 are necessarily completely linear as shown. In this case, it is better that the S1 signals for the calculation of $\beta$ and $\lambda$ in Equation 2 be limited to the linear region of curve 501. This invention is an improved technique of the prior art on-the-fly mode.

Figure 7:
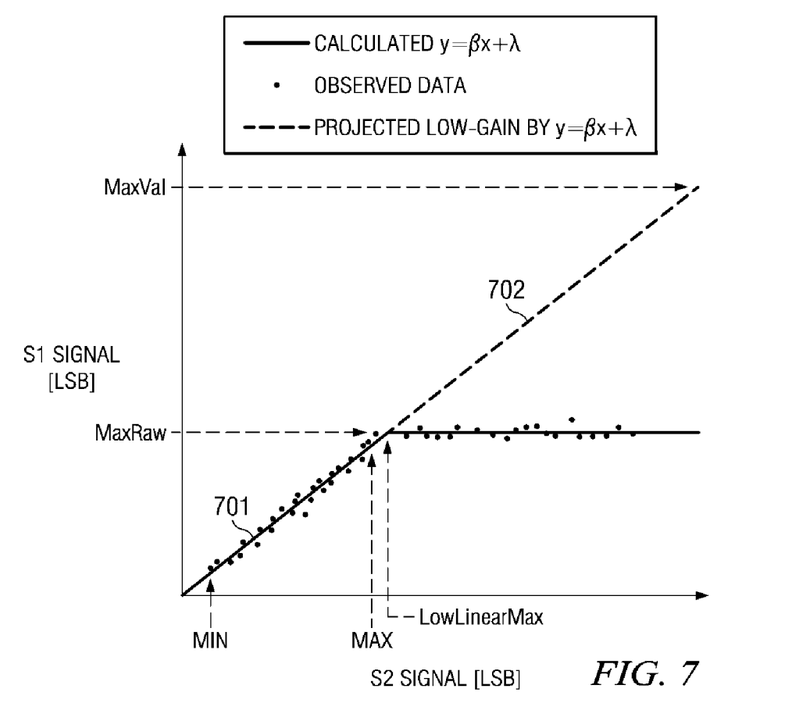
FIG. 7 illustrates the measured relationship between S1 and S2 of the collocated sensor pairs.

FIG. 7 illustrates an actual measured relationship between S1 and S2 of the collocated sensor pair. FIG. 7 illustrates a calculated linearization 701 (y=βx+λ) and the projection of the low gain signal 702. The linearization 7081 employs a MLS calculation carried out using observed S1 and S2 data in the non-saturation region below LowLinearMax in the S2 axis. This value LowLinearMax is specified at design time as MaxRaw divided by design β. Collocated pairs usually show a linear relation except for the two ends near zero and near LowLinearMax. At these ends the collocated pairs don't show linearity due to offset noise and other factors. This invention removes such unreliable data from the MLS calculation. FIG. 7 illustrates that Min and Max are set with some margin. Min is set a few percent of LowLinearMax above zero. Max is set a few percent of LowLinearMax below LowLinearMax. This is satisfactory if the region between Min and Max has a high enough linearity. In some cases, non-linear regions remain.

Figure 8:
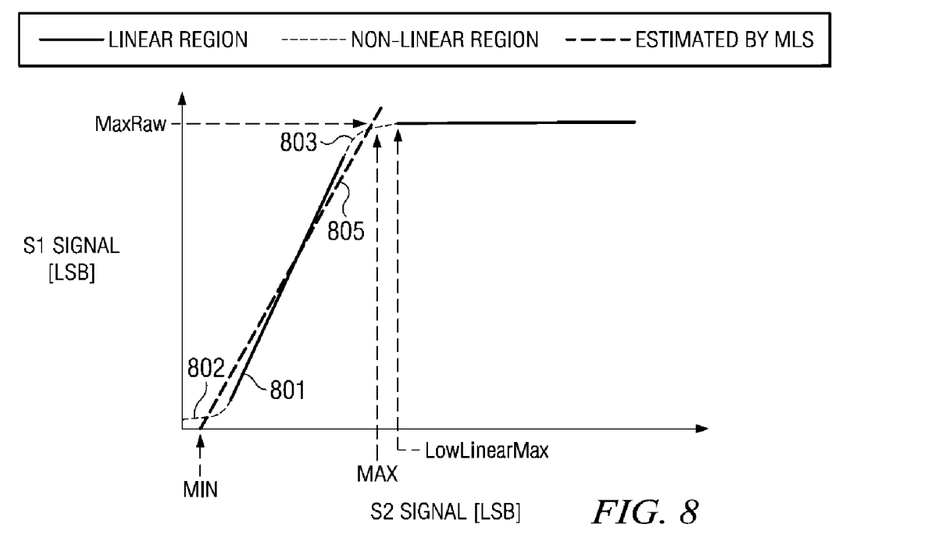
FIG. 8 which is a close view of the mostly linear region of the S1 and S2 relationship of FIG. 7.

This is illustrated in FIG. 8 which is a close view of the mostly linear region of the S1 and S2 relationship. FIG. 8 illustrates linear region 801, first non-linear region 802 near zero, second non-linear region 803 near LowLinearMax and the MLS calculated tine 805. The example illustrated in FIG. 8 shows the gradient β of MLS estimated curve 805 is smaller than the gradient of linear region 801. The gradient of linear region 801 is considered more accurate. In this invention in order to obtain a more accurate β, the data set in a sub-region between Min and Max used for MLS calculation of β and λ is shifted in various positions. The sub-region yielding the maximum β is assumed the best data set for MLS. Obtaining β and λ in this way should be the most appropriate.

This invention is a derivative of MLS called selected representative MLS (SR-MLS). SR-MLS is better suited for calculation of the relationship formula. SR-MLS estimates the best linear expression y=βx+λ from observed data where: x denotes S2 data; and y denotes S1 data. Using all observed data would not be the best choice because this would require a large amount of memory, many computations and would hamper finding the genuine relationship formula. Thus this invention applies SR-MLS to representative values: $(x_0, y_0)$, $(x_1, y_1)$, ... $(x_N, y_N)$ for i=0, 1, 2, ... N. Assume $x_{j+1}=x_j+$ $x_{interval}$ for j=0, 1, 2, ... N. In this case $x_{interval}$ is the interval in the x axis between two successive representative points in the S1 versus S2 curve. Thus $x_{interval}$ is (Max−Min)/N. The S1 value that corresponds to $x_i$ is represented by an average of S1 data whose collocated S2 signal is $x_i$. If there is no collocated pair at representative S2 point $x_i$ one is computed by interpolation or extrapolation from data whose C1 value fall near $x_i$.

Figure 9:
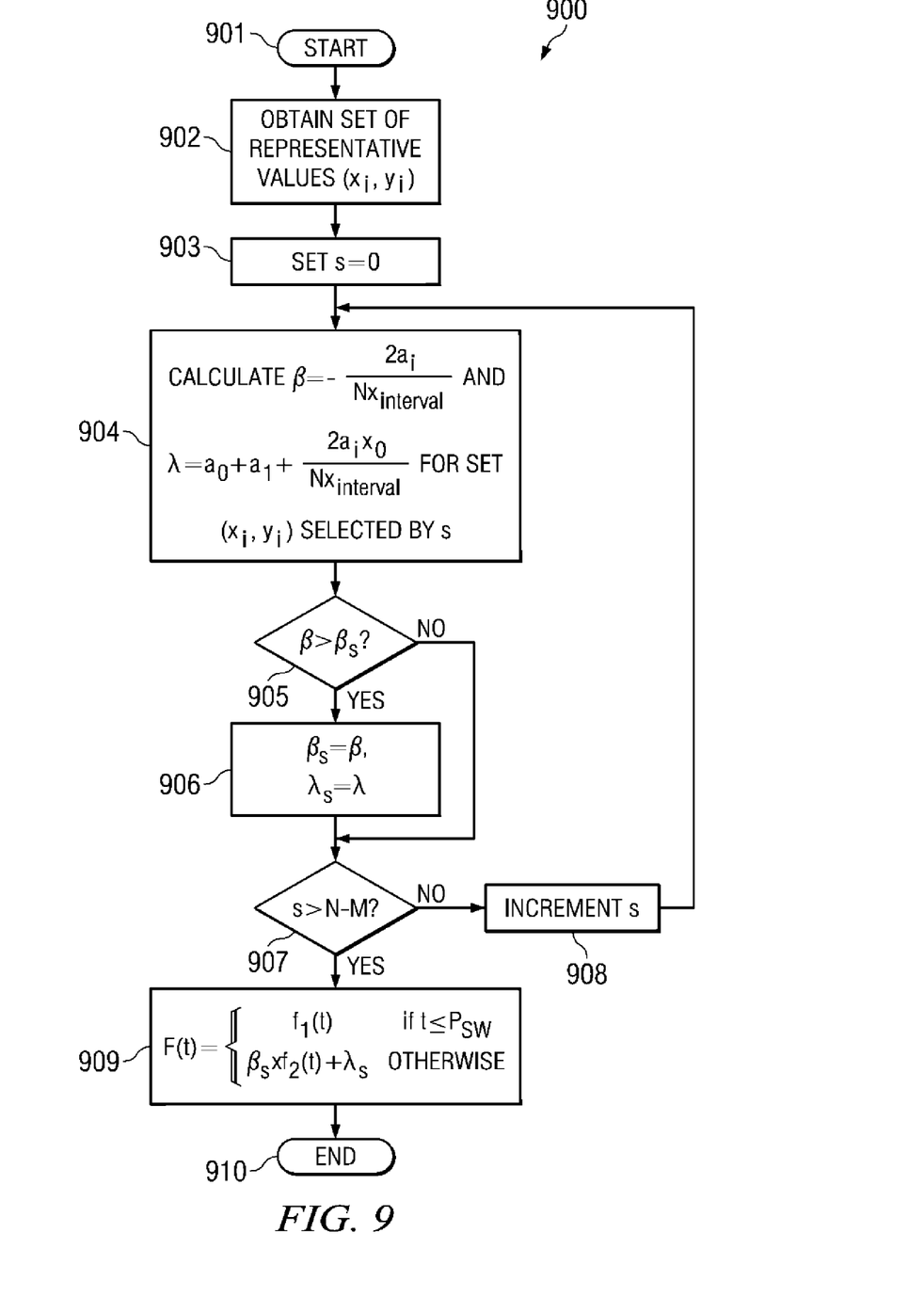
FIG. 9 illustrates a flow chart of the method of this invention.

SR-MLS is relatively simple and the required computations are smaller than a plain MLS. FIG. 9 illustrates a flow chart of method 900 of this invention. Method 900 operates to calibrate the linear fitting of signals S1 and S2. There are several possible times which this calibration can be performed. One embodiment performs the calibration once upon initial testing of the image sensing system. Another embodiment performs the calibration upon each initial powering of the image sensing system. Other embodiments perform method 900 on the fly. These include periodically performing method 900 based upon operation time or number of exposures of the image sensing system. The actual technique employed should be selected based upon the stability of the relationship of the sensor signals S1 and S2.

Method 900 starts at start block 901. Method 900 obtains the representative values $(x_0, y_0), (x_1, y_1), \ldots (x_N, y_N)$ in block 902. Block 903 assumes the relationship of values $x_i$ is:

$$x_i = x_{interval} h_i + x_0 \quad (3)$$

where: $h_i=0, 1, 2, \ldots, N$. This assumption relates an equally-spaced sequence $x_i$ to the integer numbers $h_i$ that range from 0 to N. Using this relational expression, $y_i=\beta x_i+\lambda$ can be transformed into $y_i=\beta x_{interval}+(\beta x_0+\lambda)$. Then, $y_i$ can be represented as a function of $h_i$. Thus $y_i=q(h_i)$.

In general, arbitrary polynomial $P(h_i)$ of order m can be expressed as:

$$P(h_i) = a_0 P_{N0}(h_i) + a_1 P_{N1}(h_i) + \ldots + a_m P_{Nm}(h_i) \quad (4)$$

$$= \sum_{k=0}^{m} a_k P_{Nk}(h_i)$$

where: m<N; $a_k$ are coefficients of each term; and $P_{Nk}(h_i)$ is called orthogonal polynomial. The orthogonal polynomial is represented by:

$$P_{Nk}(h_i) = \sum_{i=0}^{k} (-1)^i \binom{k}{l}\binom{k+1}{l}\frac{(h_i)^{(l)}}{(N)^{(l)}} \quad (5)$$

where:

$$\binom{k}{l} = \frac{k!}{l!(k-1)!}$$

is called binomial coefficient; and $(N)^{(1)}=N(N-1) \ldots (N-1+1)$ is called the factorial polynomial. Equation 4 can be solved for $a_k$ due to the orthogonality of $P_{Nk}(h_i)$ as follows (details omitted):

$$a_k = \frac{\sum_{i=0}^{N} P(h_i) P_{Nk}(h_i)}{\sum_{i=0}^{N} P_{Nk}^2(h_i)} \quad (6)$$

Equation (5) is only dependent on N, k, and $h_i$. These values are independent of the representative values of the relationship between S1 and S2. The numerical values of $P_{Nk}(h_i)$ and $$\sum_{i=0}^{N} P_{Nk}^2(h_i)$$

in Equation (6) can be precalculated and stored on a memory prior to the calculation of Equation (5) using instantaneous representative values. This technique enables a relatively simple calculation of $a_k$. If the relationship between S1 and S2 is a linear function, then equation (4) can be rewritten as:

$$P(h_i) = \alpha_0 P_{N0}(h_i) + \alpha_1 P_{N1}(h_i) \qquad (7)$$

From equation (5) $P_{N0}(h_1) = 1$ and $$P_{N1}(h_i) = 1 - 2\frac{h_i}{N}.$$

Substituting these expressions into equation (7) yields the more easily understood expression:

$$P(h_i) = -\frac{2a_1}{N}h_i + (a_0 + a_1) \qquad (8)$$

Because $P(h_i)$ can be replaced with $y_i = q(h_i)$ we can solve for $\beta$ and $\lambda$ as follows:

$$\beta x_{interval} h_i + (\beta x_0 + \lambda) = -\frac{2a_1}{N}h_i + (a_0 + a_1) \qquad (9)$$

Thus:

$$\beta = -\frac{2a_1}{Nx_{interval}} \qquad (10)$$

and $$\lambda = a_0 + a_1 + \frac{2a_i x_0}{Nx_{interval}} \qquad (11)$$

Thus estimates of both $\beta$ and $\lambda$ can be calculated from the representative values. In order to obtain the most effective values of $\beta$ and $\lambda$, the process searches successive windows of values $(x_i, y_i)$. Each computation uses consecutive values: $(x_{0+s}, y_{0+s})$, $(x_{1+s}, y_{1+s})$, ..., $(x_{M-1+s}, y_{M-1+s})$ selected from the representative values $(x_0, y_0)$, $(x_1, y_1)$, ..., $(x_M, y_M)$ where M<N and s=0, 1, 2, ..., N−M. The particular value of s selects a subset of the representative values $(x_0, y_0)$. The SR-MLS calculation for $\beta$ and $\lambda$ are carried out for all allowed values of s. The invention determines the largest value $\beta_s$ among all the estimated B is considered the value. This value $\beta_s$ triggers selection of the corresponding $\lambda_s$ and $s_M$. These values are applied for projection of S2 to the S2 axis according to Equation (2).

Referring back to FIG. 9, block 903 sets s equal to 0. Block 904 calculates $\beta$ and $\lambda$ according to equations (9) and (10). Test block 905 determines if the just calculated value $\beta$ is greater than the tentative maximum $\beta_s$. If this is true, (Yes at text block 905), then block 906 sets a new $\beta_s$ equal to the current $\beta$ and a new $\lambda_s$ equal to the current $\lambda$. Block 906 saves these values corresponding to the new maximum value of $\beta$. If this is not true (No at test block 905), then method 900 skips block 906.

Method 900 next determines if all tentative $\beta$ and $\lambda$ calculations are complete. Test block 907 tests to determine if s≧N−M. If not (No at test block 907), then all tentative $\beta$ and $\lambda$ calculations not are complete. Block 908 increments S. Method 900 then loops back to block 904 for another tentative $\beta$ and $\lambda$ calculation. If the loops in s are complete (Yes at test block 907), then block 909 calculates the combined function F(t) according to claim 2 from the maximum value $\beta_s$ and the corresponding value $\lambda_s$. The value of Psw may be empirically determined from the value of s corresponding to $\beta_s$. As noted above the value of $P_{SW}$ used in selected to approximate the end of the linear response region in S1 as illustrated in FIG. 6.

Block 909 implements equation (2) which is the simplest implementation called hard switching. Another choice called soft switching achieves gradual migration from S1 to S2 in a transition band $P_{SW}-\theta \leq t \leq P_{SW}$. $\theta$ is an empirical constant designation a range of the transition band and is a positive number in [e−]. $\theta$ could be a predetermined constant of $P_{SW}$, such as 90%. In the S1 non-saturation band where $t \leq P_{SW}$ both S1 and S2 signals are meaningful. A typical gradual migration is weighted average g(t):

$$g(t) = \frac{\mu f_1(t) + \rho f_2(t)}{\mu + \rho} \qquad (11)$$

where: $\mu$ and $\rho$ are proportionality constants. A most practical implementation among various derivatives of weighted averaging of the type of equation (11) has weighting coefficients linear to distance from both tips of the transition band. This linear weighted averaging $g_i(t)$ is expressed by:

$$g_i(t) = \frac{(P_{SW} - t)f_1(t) + (t - P_{SW} + \theta)f_2(t)}{\theta} \qquad (12)$$

Thus the output of the WDR sensor system $F_s(t)$ is:

$$F_s(t) = \begin{cases} f_1(t) & \text{if } t \leq \theta \\ g(t) & \text{else if } t \leq P_{SW} \\ \beta f_2(t) + \lambda & \text{otherwise} \end{cases} \qquad (13)$$

Figure 10:
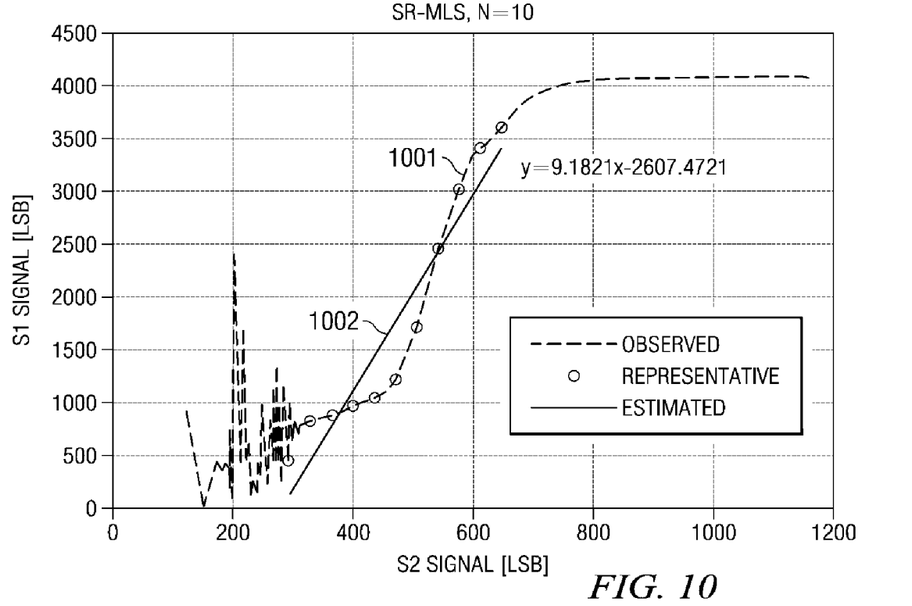
FIG. 10 illustrates an estimated linear curve not taking into account end non-linearities.
Figure 11:
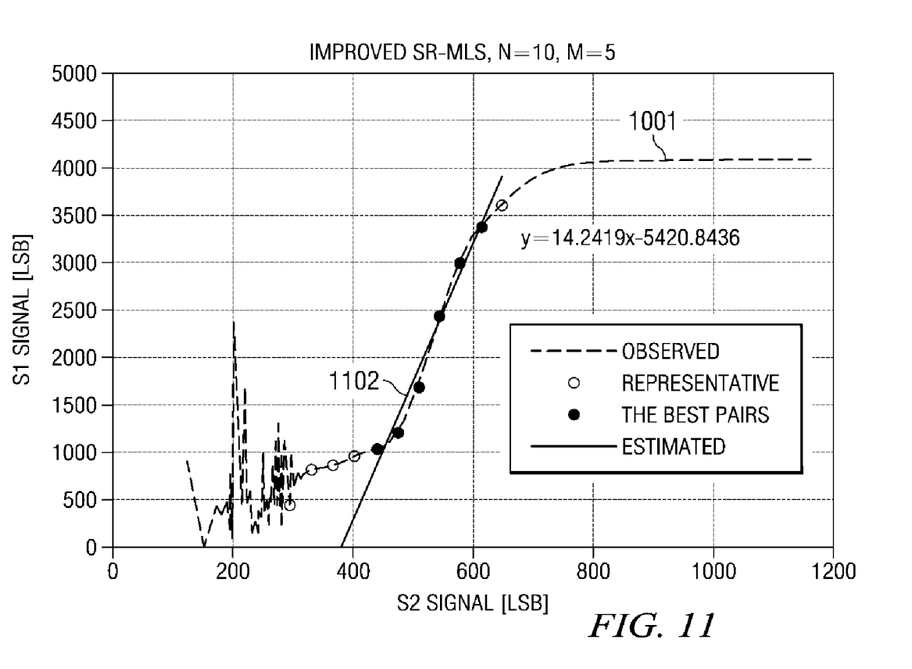
FIG. 11 illustrates an estimated linear curve using this invention which searches for the most linear section of the curve.

FIGS. 10 and 11 present the results of this invention applied to a common set of parameters set forth in Table 1.

TABLE 1

| Resolution [pels] | 3640 Horizontal by 2400 Vertical |
|---|---|
| MaxRaw [LSB] | 4095 (12 bits) |
| MaxVal [LSB] | 65,535 (16 bits) |
| Min [LSB] | 296 |
| Max [LSB] | 656 |
| $x_{interval}$ [LSB] | 36 |
| N | 10 |
| M | 5 |

FIGS. 10 and 11 result from calculations of the S2 versus S1 signal curve for a particular image sensing device. Both FIGS. 10 and 11 illustrates the actual S2 versus S1 signal curve 1001. The example of FIG. 10 estimated the linear curve by calculating y=βx+λ according to the prior art not taking into account the end non-linearities. This results in a linear approximation 1002. The example of FIG. 11 estimated the linear curve using this invention which searches for the most linear section of the curve. This results in a linear approximation 1102. Estimated linear curve 1002 has gentler slope than the slope of actual curve 1001 in the linear region. Estimated linear curve 1102 formed using the technique of this invention makes a better fit for the linear section of actual curve 1001. This better estimate would result a more appropriate projection of the S2 signal into the S1 axis.

This invention is intended for use in a wide dynamic range sensor equipped with high-gain cell and low-gain sensing cells. This proposal addresses a practical solution for the relationship formula calculation between high-gain and low-gain signals. In actual devices this relationship has nonlinear regions before the high-gain cell saturates. The inventors have determined experimentally that the proposed method derives a more accurate relationship formula between low-gain signals and high-gain signals. This provides quality improvement of the resultant image after mixing process over the original prior art method.

What is claimed is:

1. A method of mixing high-gain and low-gain signals for a wide dynamic range image sensor comprising the steps of:
   sensing a scene with a combined array of concurrent high-gain sensing cells and low-gain sensing cells;
   plotting a response curve of high-gain sensing cells against the response of low-gain sensing cells for each light level;
   for a plurality of subsets of the plot
      calculating a slope of the response curve and an offset between the high-gain response and the low-gain response,
      comparing the current calculated slope with a maximum previously observed calculated slope,
      if the current calculated slope is greater than the previously observed calculated slope, saving the current calculate slope as the maximum previously calculated slope and a corresponding calculated offset, and
   repeating for all of the plurality of subsets; and
   mixing the high-gain response and the low-gain response according to the saved maximum previously calculated slope and the corresponding calculated offset.

2. The method of claim 1, wherein:
   said steps of plotting the response curve, calculating a slope of the response curve and an offset, comparing, saving and repeating occur once upon initial calibration of the image sensor.

3. The method of claim 1, wherein:
   said steps of plotting the response curve, calculating a slope of the response curve and an offset, comparing, saving and repeating occur upon each initial application of electric power to the image sensor.

4. The method of claim 1, wherein:
   said steps of plotting the response curve, calculating a slope of the response curve and an offset, comparing, saving and repeating occur periodically during operation of the image sensor.

5. The method of claim 4, wherein:
   said steps of plotting the response curve, calculating a slope of the response curve and an offset, comparing, saving and repeating occur periodically during operation of the image sensor as measured by time of operation of the image sensor.

6. The method of claim 4, wherein:
   said steps of plotting the response curve, calculating a slope of the response curve and an offset, comparing, saving and repeating occur periodically during operation of the image sensor as measured by a number of exposures taken by the image sensor.

7. The method of claim 1, wherein:
   said step of plotting the response of high-gain sensing cells against the response of low-gain sensing cells forms a plurality of N representative values $(x_0, y_0)$ to $(x_{N-1}, y_{N-1})$; and
   said subsets consist of sets $(x_{0+s}, y_{0+s}), (x_{1+s}, y_{1+s}), \ldots, (x_{M-1+s}, y_{M-1+s})$ selected from the representative values where M<N and s=0, 1, 2, ..., N–M.

8. The method of claim 1, wherein:
   said step of calculating a slope and an offset for said subset calculates according to:

$$\beta = -\frac{2a_1}{Nx_{interval}}$$

where: β is the slope; $a_1$ is the linear term in a linear approximation of the response curve; $x_{interval}$ is the average step in response curve, and $$\lambda = a_0 + a_1 + \frac{2a_1 x_0}{Nx_{interval}}$$

where: λ is the offset; $a_0$ is the constant term in a linear approximation of the response curve.

9. The method of claim 1, wherein:
   said step of mixing operates according to:

$$F(t) = \begin{cases} f_1(t) & \text{if } t \le P_{SW} \\ \beta \times f_2(t) + \lambda & \text{otherwise} \end{cases}$$

where: F(t) is the mixed response of the wide dynamic range image sensor; $f_1(t)$ is the high-gain response; $P_{SW}$ the minimum input light that yields a saturated output signal from the high-gain response; β is the slope of the response curve; $f_2(t)$ is the low-gain response; and λ is the offset of the response curve.

10. The method of claim 1, wherein:
said step of mixing operates according to:

$$F_s(t) = \begin{cases} f_1(t) & \text{if } t \leq \theta \\ g(t) & \text{else if } t \leq P_{SW} \\ \beta f_2(t) + \lambda & \text{otherwise} \end{cases}$$

where: $F_s(t)$ is the mixed response of the wide dynamic range image sensor; $\theta$ is an empirical constant setting the range of a transition band; $f_1(t)$ is the high-gain response; $g(t)$ is a mixed high-gain and low-gain response; $P_{SW}$ the minimum input light that yields a saturated output signal from the high-gain response; $\beta$ is the slope of the response curve; $f_2(t)$ is the low-gain response; and $\lambda$ is the offset of the response curve.

11. The method of claim 10, wherein:
said step of mixing wherein:

$$g_i(t) = \frac{(P_{SW} - t)f_1(t) + (t - P_{SW} + \theta)f_2(t)}{\theta}.$$

12. The method of claim 10, wherein:
$\theta$ is a predetermined percentage of $P_{SW}$.

13. The method of claim 12, wherein:
the predetermined percentage is 90%.

* * * * *